United States Patent [19]

Brinkman

[11] 3,933,708

[45] Jan. 20, 1976

[54] CRAYON WAX COMPOSITION

[75] Inventor: Robert B. Brinkman, Farmington, Mich.

[73] Assignee: Sun Oil Company of Pennsylvania, Philadelphia, Pa.

[22] Filed: May 24, 1973

[21] Appl. No.: 363,781

[52] U.S. Cl. ........................ 260/23 H; 260/28.5 A
[51] Int. Cl.² .......................................... C08L 91/00
[58] Field of Search .................... 260/23 H, 28.5 A

[56] References Cited
UNITED STATES PATENTS

| | | | |
|---|---|---|---|
| 2,882,246 | 4/1959 | Leatherman | 260/28.5 A |
| 3,349,052 | 10/1967 | Zaayenga | 260/28.5 A |
| 3,476,700 | 11/1969 | Moyer | 260/28.5 A |
| 3,491,043 | 1/1970 | Zmitrovis | 260/23 H |
| 3,520,842 | 7/1970 | Crean | 260/28.5 A |
| 3,574,155 | 4/1971 | Parker | 260/28.5 A |
| 3,607,808 | 9/1971 | Thompson | 260/28.5 A |
| 3,763,059 | 10/1973 | Needham | 260/23 H |

*Primary Examiner*—Melvyn I. Marquis
*Assistant Examiner*—William E. Parker
*Attorney, Agent, or Firm*—J. Edward Hess; Donald R. Johnson; Anthony Potts, Jr.

[57] ABSTRACT

An improved crayon wax composition having a wax base, stearic acid, pigment and an additive mixture which comprises polyethylene having a molecular weight between 500,000–6,000,000 is disclosed. Use of the polyethylene in small amounts enables the replacement of higher melting point waxes with low-melting point paraffin wax of 120°–140°F, while still maintaining the required performance qualities of the crayon wax.

5 Claims, No Drawings

CRAYON WAX COMPOSITION

BACKGROUND OF THE INVENTION

Waxes are a commonly used material in the composition of various marking devices. A marking device which is well known has been in the form of crayons made from various waxes and additives to form both the marking medium and the structural shape of the crayon. Such a dual purpose, i.e., marking and structure, has imposed somewhat incompatible requirements on the composition. The composition must necessarily be solid, possess structural rigidity and strength to form a satisfactory supporting structure, yet must also be soft enough to form a carrier for the pigment which will be deposited under pressure on the surface of the material to be marked. Of necessity, the various compositions for crayon waxes used to the present time have been comprised between obtaining satisfactory strength and resistance to breaking, while simultaneously possessing sufficient softeners and flow qualities under pressure to give a satisfactory marking.

Presently a composition used is composed of paraffin wax having a melting point usually between 140° and 165°F and a few percent of microcrystalline wax. Additionally, stearic acid and the desired dye or pigment is added to make the complete crayon wax composition. Such a blend possesses sufficient suitable qualities such as resistance and adequate marking ability. However, due to the high ambient temperatures to which certain crayons may be subjected, it is desirable to increase the resistance to softening while at the same time to enhance the brightness of the marking. This is a present problem confronting the manufacturers of improved crayon waxes.

U.S. Pat. No. 2,882,246 of Leatherman et al., issued Apr. 14, 1959, discloses a wax composition containing polyethylene having a molecular weight in the range of 3,000 to 150,000. However, changes in the properties of the wax composition are generally directly proportional to the amount of the polyethylene present in the composition. U.S. Pat. No. 3,491,043 of Zmitrovis, issued Jan. 20, 1970, discloses a wax composition containing an additive - a Fischer-Tropsch wax and an amorphous polypropylene. However, the additive does not permit the substitution of a lower melting point paraffin wax for the higher melting point paraffin wax in the composition and still maintain the desired qualities of the resulting product.

SUMMARY OF THE INVENTION

This invention therefore relates to an improved crayon wax composition having a paraffin wax base, stearic acid, pigment and small quantities of polyethylene having a molecular weight from about 500,000 to about 6,000,000. The use of the latter surprisingly imparts to the composition improved resistance to softening at high ambient temperature while permitting the substitution of low melting point wax for high melting point wax in the wax base. In addition, markings from the improved crayon wax composition have an enhanced brightness. Furthermore, none of the other desired properties for a crayon wax composition are adversely influenced.

DESCRIPTION OF THE INVENTION

The crayon wax composition of this invention has for its basic constituent a wax in the amount of about 30–99% by weight of the composition.

Normally, the preferred base wax for a crayon wax composition is paraffin wax having a melting point between 140°F to 150°F. It may, however, contain microcrystalline wax having melting points of from about 140°F to about 210°F, and/or vegetable, insect and animal waxes and mixtures thereof.

Ordinarily, commercial paraffin wax consists of straight chain or normal paraffin hydrocarbons of the $C_nH_{2n+2}$ series. These hydrocarbons have average molecular weights in the range of 360° to 492 with individual components varying from $C_{20}$ to $C_{35}$, although there are some higher melting waxes with molecular weights of up to 600. Generally, these paraffin waxes are characterized by having a melting point between 120°F and 165°F and a viscosity between 35 and 60 SUS at 210°F. They are produced from the heavier fractions of petroleum distillates, by first dewaxing the distillate to obtain slack wax and then deoiling the slack wax to obtain the paraffin wax.

Another constituent which is included in the crayon wax composition is stearic acid. The stearic acid is added generally in the amount of from about 10% to about 50% by weight, but more likely in the quantity of from about 20% to about 40% by weight.

To impart a color to the crayon wax composition as well as the desired color of the wax when applied as a marking, a pigment is added. This pigment is included in an amount to sufficiently impart the desired color density to the applied crayon wax composition and may be in the amount of from about 0.5% to about 25% by weight.

In order to obtain improved resistance to softening caused by high ambient temperatures, it has been found that the inclusion of polyethylene having a molecular weight of from 500,000 to 6,000,000 in quantities from approximately 0.10 to 10% by weight adds materially to the aforementioned desired property. It is preferred that the polyethylene be included in the amount of from about 0.25% to 5% by weight in the composition. Polyethylene having molecular weights of from 500,000 to 6,000,000 is described in *ENCYCLOPEDIA OF CHEMICAL TECHNOLOGY*, Kirk & Othmer, (2nd Edition), Vol. 14, pages 264–265. Such polyethylenes have a nil melt index (ASTM D1248-65T-D1238, Condition E) and unusually good izod impact (D265) and environmental stress crack (D1693-60T) compared to lower molecular weight polyethylenes.

The improved resistance to softening caused by high ambient temperature surprisingly created by the use of the polyethylene occurs even though some or all of the high melting point wax of the crayon wax composition is replaced by low melting point wax. Also unexpected is that the brightness of the marking is enhanced by the improved crayon wax composition. And also unexpected is that the other desired properties of the crayon wax composition, such as hardness, is not adversely influenced by the inclusion of the lower melting and softer waxes.

TABLE

Comparative Results-Composition of Present Invention and Other Compositions

| Crayon Wax Composition | Resistance to Softening at High Ambient Temperatures | Brightness of Marking |
|---|---|---|
| (A) Typical Composition | Standard | Standard |
| (B) Replacement of All High Melting Wax in (A) by Low Melting Wax | Poorer | Superior |
| (C) Addition of Polyethylene* to (B) | Better | Superior |
| (D) Replacement of Portion High Melting Point Wax of (A) with Mixture of Low Melting Point Wax and Polyethylene* | Better | Superior |

*Polyethylene having molecular weight of about one million.

The following illustrative examples more fully describe the composition of this invention and provides contrasting results.

EXAMPLES

A wax crayon composition is prepared using 68% by weight paraffin wax having a 145°F melting point (Sunoco Paraffin Wax 4412), 30% by weight stearic acid, 1% by weight microcrystalline wax having a 193°F melting point (Sunoco Microcrystalline Wax 985); and the balance an orange dye. This wax crayon is the standard by which other wax crayon wax compositions are compared; it is referred to in the accompanying table as Typical Composition (A). This typical composition is tested as to its resistance to softening at high ambient temperature (about 90°–95°F) and as to the brightness of its marking. These test results are listed in the accompanying table as "standard".

Another wax crayon composition is prepared in a similar fashion to the aforementioned composition (A) but replacing a paraffin wax having a 145°F melting point is a paraffin wax having a 129°F melting point. As shown in the accompanying table, this wax composition (B) has a poorer resistance to softening at high ambient temperature than the typical composition (A); however, the brightness of its marking is superior. This comparative result indicates why low melting point waxes are generally unacceptable as a component of wax crayon compositions.

A third wax crayon composition (C) illustrating present invention, is prepared in a similar fashion to the aforementioned composition (B) but the components were as follows: 63% by weight of the low melting point paraffin wax, 5% by weight of polyethylene having a molecular weight in excess of one million, 30% by weight of stearic acid and the balance as orange dye. As shown in the accompanying table, this wax crayon composition (C) has better resistance to softening at high ambient temperature and superior brightness of marking than the standard, i.e., Typical Composition (A). This result indicates how a small amount of said polyethylene substantially improves the characteristic of the wax crayon composition.

A fourth wax crayon composition (D) is prepared in a similar fashion to the aforementioned composition (A) but 39% of the high melting point paraffin wax of composition (A) is replaced with a mixture containing 34% of the low melting point paraffin wax and of composition (B) and 5% of the polyethylene of composition (C). As shown in the accompanying table, this wax crayon composition (D) has a better resistance to softening at high ambient temperature and a superior brightness of marking than the standard, i.e., Typical Composition (A). This result indicates that a mixture of low melting point paraffin wax and polyethylene having a molecular weight of about one million can be substituted for high melting point paraffin wax typically used in a wax crayon composition.

Typical properties of the polyethylene used in the aforementioned compositions are:

| Molecular Weight | 1,250,000 |
|---|---|
| Crystalline Melting Point | 266–268°F |
| Melt Index (ASTM D1238, Condition E) | nil |
| Specific Gravity | 0.940–0.942 |

Use of other polyethylenes having molecular weights between 500,000 and 6,000,000 yield analogous results.

Typical properties of the waxes used in the aforementioned crayon composition are:

| Property | High Melting Point[a] | Low Melting Point[b] |
|---|---|---|
| Melting Point (AMP) | 145°F | 129°F |
| Oil Content (ASTM D721) | 0.2% | 0.4% |
| Color, Saybolt (ASTM D156) | +28 | +29 |
| Specific Gravity at 60°F | 0.925 | 0.906 |
| Blocking Temp. ASTM D1465) | 112/115°F | — |

[a] Sunoco Wax 5415
[b] Sunoco Wax 3425 and/or Sunoco Wax P-127

The invention claimed is:

1. An improved crayon wax composition containing a base wax, stearic acid, and a pigment wherein the improvement consists essentially of an additive mixture of:
   a. polyethylene having a molecular weight of about 500,000–6,000,000 wherein the polyethylene is in the amount of about 0.10%–10% by weight of the total composition; and
   b. paraffin wax having a melting point of about 120°F–140°F.

2. Crayon wax composition according to claim 1 wherein the base wax consists essentially of paraffin wax having a melting point of about 140°F–165°F, and a microcrystalline wax having a melting point of about 140°F–210°F.

3. Crayon wax composition according to claim 2 wherein the base wax consists essentially of the paraffin wax in the amount of about 30%–95% by weight, the microcrystalline wax in the amount of about 1%–5% by weight, the stearic acid in the amount of about 10%–50% by weight and the pigment in the amount of about 0.5%–25% by weight.

4. A crayon wax composition consisting essentially of:
   a. polyethylene having a molecular weight of about 500,000–6,000,000 wherein the polyethylene is in the amount of about 0.25%–5% by weight of the total composition,
b. paraffin wax having a melting point of about 120°F–140°F,
c. stearic acid; and
d. pigment.

5. A composition according to claim 4 wherein the stearic acid is in the amount of 10%–50% by weight and the pigment is in the amount of about 0.5%–75% by weight of the total composition.

* * * * *